US008755341B2

(12) United States Patent
Ishii et al.

(10) Patent No.: US 8,755,341 B2
(45) Date of Patent: *Jun. 17, 2014

(54) MOBILE COMMUNICATION METHOD, MOBILE STATION, AND RADIO BASE STATION

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/989,283

(22) PCT Filed: Apr. 22, 2009

(86) PCT No.: PCT/JP2009/058008
§ 371 (c)(1),
(2), (4) Date: Dec. 23, 2010

(87) PCT Pub. No.: WO2009/131154
PCT Pub. Date: Oct. 29, 2009

(65) Prior Publication Data
US 2011/0116463 A1    May 19, 2011

(30) Foreign Application Priority Data

| Apr. 22, 2008 | (JP) | P2008-111922 |
| May 29, 2008 | (JP) | P2008-141685 |
| Apr. 20, 2009 | (JP) | P2009-102500 |

(51) Int. Cl.
*H04W 4/00*    (2009.01)
*H04J 3/16*    (2006.01)

(52) U.S. Cl.
USPC ............. 370/329; 370/437; 455/450

(58) Field of Classification Search
None
See application file for complete search history.

(56) References Cited

U.S. PATENT DOCUMENTS

| 7,636,573 B2 * | 12/2009 | Walton et al. ............... 455/454 |
| 7,646,742 B2 * | 1/2010 | Petrovic et al. ............. 370/328 |
| 7,953,022 B2 * | 5/2011 | Chun et al. .................. 370/252 |
| 8,098,641 B2 * | 1/2012 | Govindan et al. ........... 370/338 |

(Continued)

FOREIGN PATENT DOCUMENTS

| WO | 2007/148704 A1 | 12/2007 |
| WO | 2008/041805 A1 | 4/2008 |

OTHER PUBLICATIONS

U.S. Appl. No. 61/038,330, filed Mar. 20, 2008, Malkamaki et al., "Data Indicator for Persistently Allocated Packets in a Communication System".*

(Continued)

*Primary Examiner* — Gregory Sefcheck
(74) *Attorney, Agent, or Firm* — Osha Liang LLP

(57) ABSTRACT

In a mobile communication method according to the present invention, a mobile station (UE) transmits uplink data to a radio base station by using an uplink radio resource assigned to the mobile station by predetermined scheduling information, in a predetermined cycle. The method includes the steps: (A) notifying, to the mobile station (UE), the predetermined cycle and information on the uplink radio resource; (B) notifying, to the mobile station (UE), the predetermined scheduling information; and (C) transmitting uplink data in the predetermined cycle by using the uplink radio resource assigned by the predetermined scheduling information, the transmission starting at a certain point determined on the basis of the received predetermined scheduling information. In the step (C), the predetermined scheduling information is discarded, when the information on the uplink radio resource and information notified by the predetermined scheduling information are inconsistent with each other.

4 Claims, 4 Drawing Sheets

(56) References Cited

U.S. PATENT DOCUMENTS

| | | | |
|---|---|---|---|
| 2004/0203623 A1* | 10/2004 | Wu | 455/412.1 |
| 2006/0089104 A1* | 4/2006 | Kaikkonen et al. | 455/67.13 |
| 2008/0076386 A1* | 3/2008 | Khetawat et al. | 455/410 |
| 2008/0227442 A1* | 9/2008 | Pani et al. | 455/422.1 |
| 2009/0170426 A1* | 7/2009 | Jung et al. | 455/7 |
| 2009/0257385 A1* | 10/2009 | Meylan et al. | 370/329 |
| 2010/0142453 A1 | 6/2010 | Harada et al. | |
| 2011/0019715 A1* | 1/2011 | Brisebois | 375/130 |
| 2011/0103336 A1* | 5/2011 | Ishii et al. | 370/329 |
| 2011/0116463 A1* | 5/2011 | Ishii et al. | 370/329 |
| 2011/0182245 A1* | 7/2011 | Malkamaki et al. | 370/329 |

OTHER PUBLICATIONS

U.S. Appl. No. 61/038,037, filed Mar. 19, 2008, Meylan et al., "Filtering Semi-Persistent Scheduling False Alarms".*

Japanese Office Action for Application No. 2009-102500, mailed on Apr. 6, 2010 (6 pages).

Japanese Office Action for Application No. 2009-102500, mailed on Jul. 14, 2009 (5 pages).

Japanese Office Action for Japanese Application No. 2010-106821, mailed on May 24, 2011 and English translation thereof (5 pages).

Samsung, "Issues on VoIP support," 3GPP TSG-RAN2 Meeting #61, R2-080829, Feb. 15, 2008, 2 pages.

Nokia Corporation, et al., "Indication of persistent allocation for UL," 3GPP TSG-RAN WG2 Meeting #61bis, R2-081962, Apr. 4, 2008, 3 pages.

3GPP TS 36.211 V8.1.0, "Evolved Universal Terrestrial Radio Access (E-UTRA); Physical Channels and Modulation," Nov. 2007, 54 pages.

3GPP TS 36.300 V8.3.0, "Technical Specification Group Radio Access Network; Evolved Universal Terrestrial Radio Access (E-UTRA) and Evolved Universal Terrestrial Radio Access Network (E-UTRAN)," Dec. 2007, 121 pages.

International Search Report issued in PCT/JP2009/058008, mailed on Jul. 21, 2009, with translation, 4 pages.

Written Opinion issued in PCT/JP2009/058008, mailed on Jul. 21, 2009, 4 pages.

Japanese Office Action for Japanese Application No. 2011-112827, mailed on Jul. 26, 2011, and English translation thereof (3 pages).

Extended Search Report for European Application No. 09735400.5 dated Sep. 20, 2011 (7 pages).

Office Action for Japanese Application No. 2010-106821 dated Oct. 25, 2011, with English translation thereof (4 pages).

Office Action for Japanese Application No. 2011-112827 dated Oct. 25, 2011, with English translation thereof (4 pages.).

3GPP TSG-RAN WG2 #61bis, Tdoc R2-081461, "Report form the email discussion on the configuration of semipersisitent scheduling", Shenzhen, China, Apr. 4, 2008 (4 pages).

Office Action for Japanese Patent Application No. 2011-112827 mailed Apr. 3, 2012, with English translation thereof (4 pages).

Extended European search report for European Application No. 12187577.7 dated Nov. 22, 2012 (6 pages).

Office Action in corresponding Canadian Application No. 2,725,463 dated Feb. 19, 2013 (5 pages).

Ericsson; "PDCCH contents—status from e-mail discussions"; TSG-RAN WG1 #50, R1-073809; Athens, Greece; Aug. 20-24, 2007 (3 pages).

Office Action issued in corresponding Canadian Application No. 2,725,463, mailed Aug. 26, 2013 (4 pages).

* cited by examiner

FIG. 1

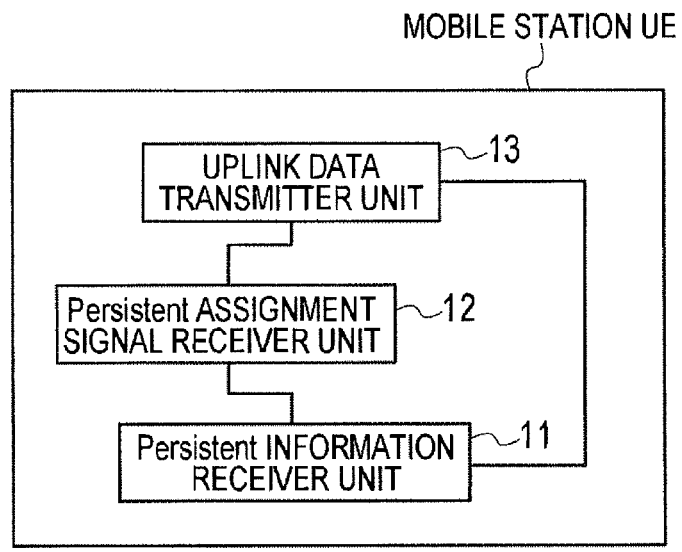

FIG. 2

| Format Indicator | INFORMATION INDICATING WHETHER RELEVANT PDCCH IS INFORMATION FOR UPLINK OR INFORMATION FOR DOWNLINK |
| --- | --- |
| Hopping flag | INFORMATION INDICATING WHETHER OR NOT HOPPING IS APPLIED TO UPLINK SIGNAL TRANSMISSION OF WHICH IS INSTRUCTED BY RELEVANT PDCCH |
| RB assignment information | INFORMATION INDICATING RESOURCE BLOCK ALLOCATION INFORMATION FOR UPLINK SIGNAL TRANSMISSION OF WHICH IS INSTRUCTED BY RELEVANT PDCCH |
| MCS information | INFORMATION INDICATING INFORMATION ON MCS FOR UPLINK SIGNAL TRANSMISSION OF WHICH IS INSTRUCTED BY RELEVANT PDCCH |
| New Data Indicator | INFORMATION INDICATING WHETHER UPLINK SIGNAL TRANSMISSION OF WHICH IS INSTRUCTED BY RELEVANT PDCCH IS FOR NEW TRANSMISSION OR RETRANSMISSION |
| TPC | INFORMATION FOR UPLINK TRANSMISSION POWER CONTROL FOR UPLINK SIGNAL SPECIFIED BY RELEVANT PDCCH |
| Cyclic shift for DMRS | INFORMATION ON Cyclic Shift OF Demodulation Reference Signal FOR UPLINK SIGNAL SPECIFIED BY RELEVANT PDCCH |
| CQI request | INFORMATION GIVING INSTRUCTION TO TRANSMIT CQI IN UPLINK |
| RNTI/CRC | UE-ID AND CRC BITS |

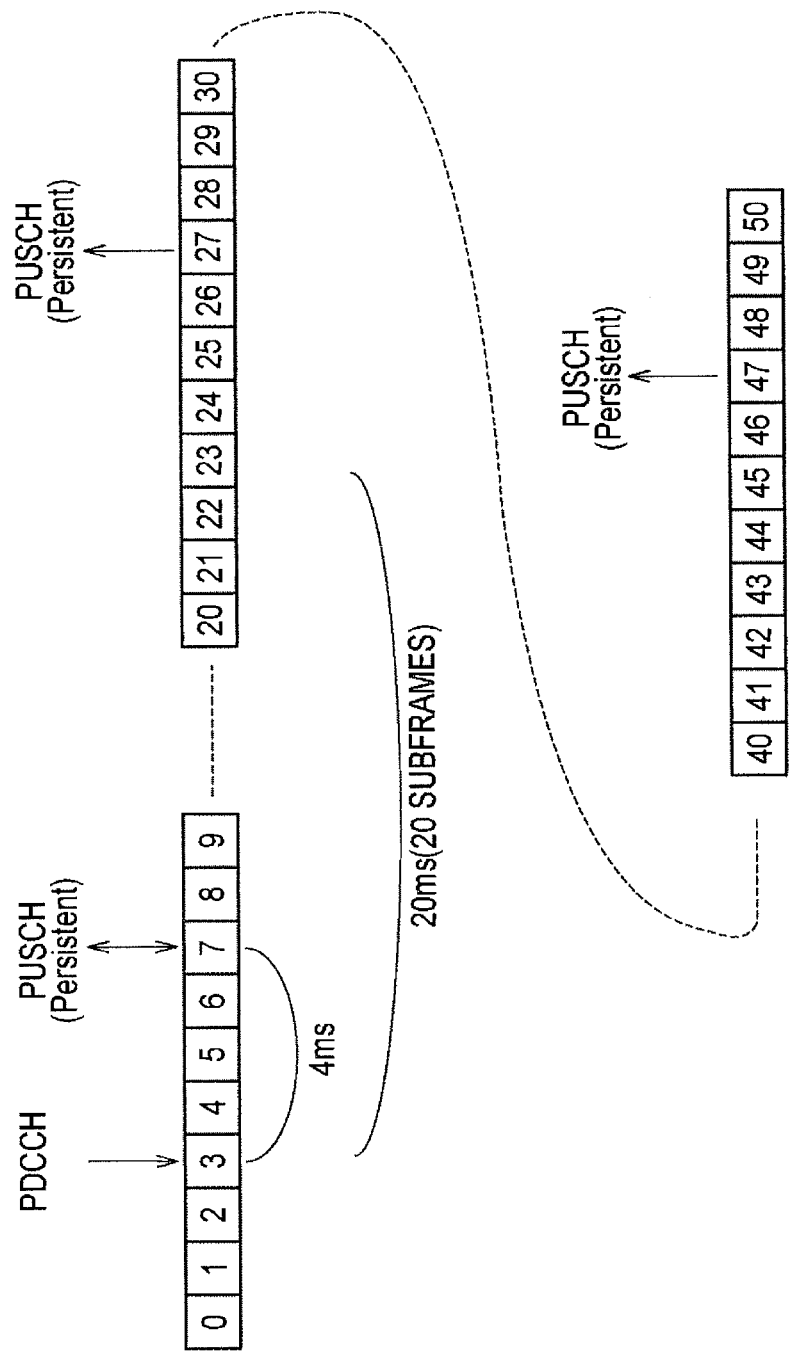

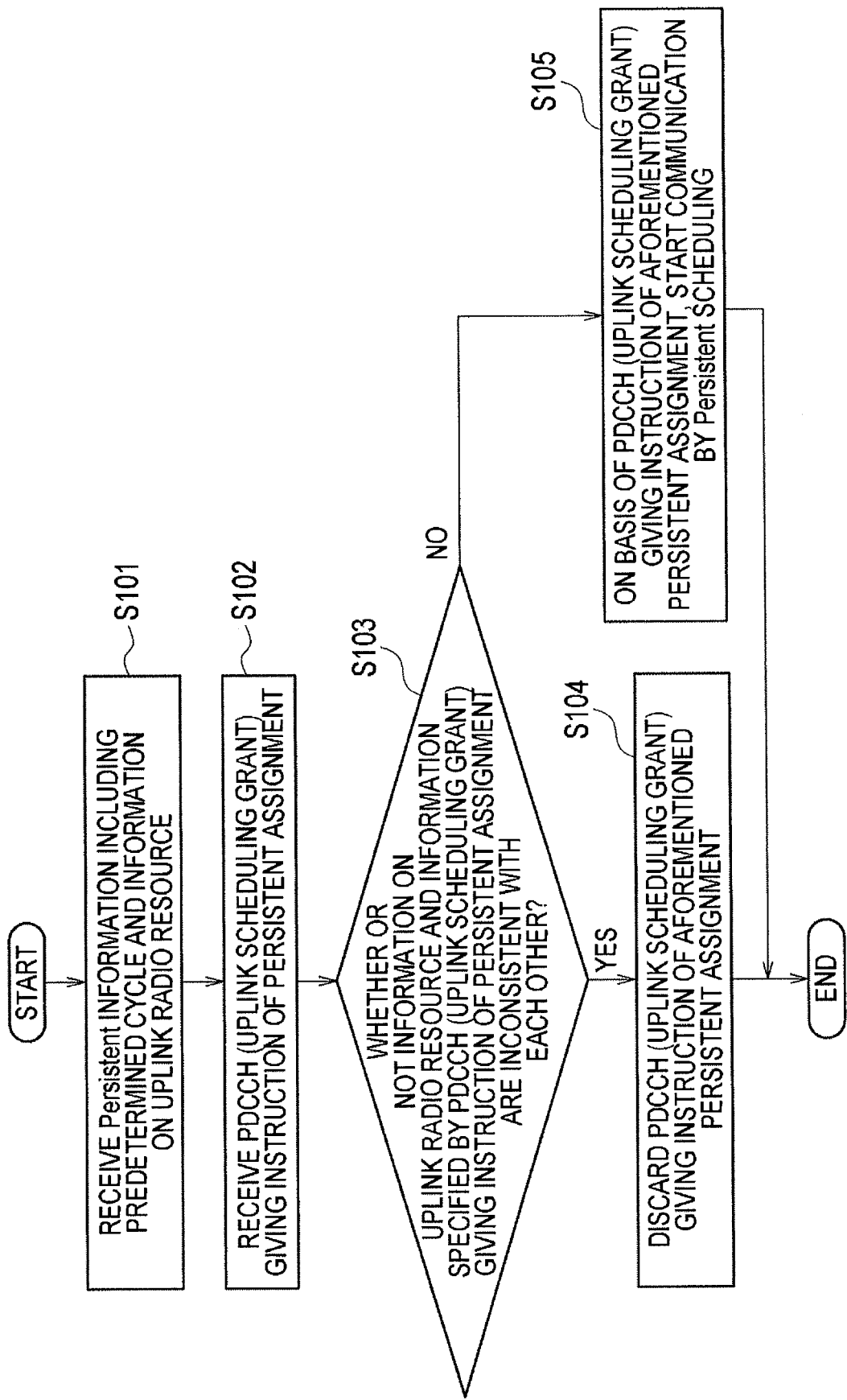

MOBILE COMMUNICATION METHOD, MOBILE STATION, AND RADIO BASE STATION

TECHNICAL FIELD

The present invention relates to a mobile communication method in which a mobile station transmits uplink data to a radio base station in a predetermined cycle by using an uplink radio resource persistently assigned to the mobile station, the transmission starting at an assignment starting time. The present invention also relates to a mobile station and a radio base station.

BACKGROUND ART

A communication method as a successor of the W-CDMA (Wideband-Code Division Multiple Access) scheme or the HSDPA (High Speed Downlink Packet Access) scheme, namely, the LTE (Long Term Evolution) scheme has been considered by the W-CDMA standardization organization 3GPP, and the specification setting work is underway.

As a radio access method of the LTE scheme, use of the OFDMA in the downlink and the SC-FDMA (Single-Carrier Frequency Division Multiple Access) in the uplink is under consideration.

The OFDMA is a method for dividing a frequency band into plural narrow frequency bands (sub-carriers) and transmitting data loaded on the respective divided frequency bands. In this method, high-speed transmission is achieved and frequency utilization efficiency is improved by arranging sub-carriers densely on the frequency bands in such a manner that the sub-carriers partially overlap but do not interfere with each other.

The SC-FDMA is a transmission method which reduces interference between terminals by dividing a frequency band and transmitting data by using frequency bands different among plural terminals. The SC-FDMA has a feature of less fluctuation in the transmission power, which achieves low power consumption and wide coverage of terminals.

The LTE scheme is a system in which plural mobile stations communicate with each other by sharing one or more physical channels in both uplink and downlink.

A channel shared by plural mobile stations is generally called a shared channel, which is, in the LTE system, a "Physical Uplink Shared Channel (PUSCH)" in the uplink and a "Physical Downlink Shared Channel (PDSCH)" in the downlink.

Also, such a shared channel is, as a transport channel, an "Uplink Shared Channel (UL-SCH)" in the uplink and a "Downlink Shared Channel (DL-SCH)" in the downlink.

In such a communication system using shared channels described above, it is necessary to select which mobile station UE the shared channel is to be assigned to, and to signal to the selected mobile station UE that the shared channel is assigned thereto, for each sub-frame (1 ms, in the LTE scheme).

In the LTE scheme, a control channel used for the signaling is called the "Physical Downlink Control Channel (PDCCH)" or "Downlink L1/L2 Control Channel (DL L1/L2 Control Channel)".

Meanwhile, the processing for each sub-frame of selecting which mobile station UE the shared channel is to be assigned to is generally called the "scheduling".

In this case, the processing may also be called the "dynamic scheduling", because the mobile station UE to which the shared channel is assigned is dynamically selected for each sub-frame.

Furthermore, the expression "assigning the shared channel" described above may be alternatively expressed as "assigning a radio resource for the shared channel".

Information of the physical downlink control channel includes, for example, the "downlink scheduling information", the "uplink scheduling grant", and the like.

The "downlink scheduling information" includes, for example, regarding the downlink shared channel, downlink resource block assignment information, UE-IDs, the number of streams, information on the precoding vector, data size, modulation method, information on the HARQ (hybrid automatic repeat request), and the like.

Meanwhile, the "uplink scheduling grant" includes, for example, regarding the uplink shared channel, uplink resource block assignment information, UE-IDs, data size, demodulation method, uplink transmission power information, information on demodulation reference signal in the uplink MIMO, and the like.

Note that, the "downlink scheduling information" and the "uplink scheduling grant" described above may be collectively referred to as "downlink control information (DCI)".

Note that, a mobile station uses a "UE-ID (RNTI)" in the uplink scheduling grant or the downlink scheduling to identify whether or not the uplink scheduling grant or the downlink scheduling is transmitted to the mobile station itself.

More specifically, CRC bits included in the uplink scheduling grant or the downlink scheduling are masked by the RNTI of the mobile station of the transmission destination.

The mobile station performs a CRC check by use of the CRC bits. Then, when the result of the CRC check is OK, the mobile station determines that the uplink scheduling grant or the downlink scheduling is transmitted to the mobile station itself. When the result of the CRC check is not OK, the mobile station determines that the uplink scheduling grant or the downlink scheduling is not transmitted to the mobile station itself.

Note that, the CRC bits are bits used for determining whether a transmitted signal is wrongly decoded or correctly decoded.

Accordingly, when a certain mobile station receives a signal in which the CRC bits are masked by the RNTI of another mobile station, the result of the CRC check becomes not OK even if the signal is actually received without an error.

In addition, the number of bits for the CRC bits and the RNTI is 16 bits, for example.

Note that, a mobile station generally attempts to decode 40 uplink scheduling grants or 40 pieces of downlink scheduling information, for example, in a single sub-frame.

In this case, the approximately 40 uplink scheduling grants or the 40 pieces of downlink scheduling information include a signal actually transmitted to the mobile station itself, a signal transmitted to another mobile station, a signal including only noise without any transmission signal, and the like, for example.

On one hand, in "Persistent scheduling", which has been studied for the purpose of implementing VoIP and the like, a radio base station eNB is configured to persistently assign an uplink or downlink radio resource (PUSCH or PDSCH) to the mobile station, in a predetermined cycle, starting at a sub-frame (assignment starting time) specified by a PDCCH (uplink scheduling grant or downlink scheduling information piece). Note that, the "Persistent scheduling" may be called "Semi-Persistent scheduling".

Here, the assignment starting time is a sub-frame in which the downlink scheduling information is transmitted in the case of downlink, and is an uplink transmission sub-frame specified by the uplink scheduling grant in the case of uplink. In addition, the predetermined cycle is 20 ms, for example.

In the "Persistent scheduling", the uplink scheduling grant or the downlink scheduling information is transmitted via a PDCCH only for the initial transmission, and no uplink scheduling grant or no downlink scheduling information is transmitted via the PDCCH for the transmissions after the initial transmission. Thus, the radio resources (overhead) required for transmitting the uplink scheduling grants or the downlink scheduling information can be reduced. As a result, efficient communications can be performed.

Note that, as described above, there are two types of the uplink scheduling grant or the downlink scheduling grant information. One of the types is for notifying, to the mobile station, a resource assignment by the Dynamic scheduling. The other one of the types is for notifying, to the mobile station, a resource assignment by the Persistent scheduling.

In this case, whether the assignment is by the Dynamic scheduling or by the Persistent scheduling described above is identified on the basis of an RNTI and the like, for example, the RNTI set in the uplink scheduling grant or the downlink scheduling information.

More specifically, an RNTI for the Dynamic scheduling and an RNTI for the Persistent Scheduling are defined, and whether the assignment is by the Dynamic scheduling or by the Persistent Scheduling is identified on the basis of the result of the CRC check of the corresponding RNTI.

SUMMARY OF INVENTION

Problem to be Solved by the Invention

As described above, whether the uplink scheduling grant or the downlink scheduling information notifies, to the mobile station, the assignment by the Dynamic scheduling or by the Persistent scheduling is identified on the basis of the RNTI and the like, the RNTI set in the uplink scheduling grant or the downlink scheduling information.

In addition, the mobile station attempts to decode approximately 40 uplink scheduling grants or 40 pieces of downlink scheduling information in a single sub-frame (within 1 ms).

Here, since each of the number of bits for the CRC bits and the number of the RNTI bits is 16 bits, the False Alarm occurs with a probability of $1/2^{16}$.

Accordingly, when 40 uplink scheduling grants or 40 pieces of downlink scheduling information are to be decoded, the probability of the occurrence of the False Alarm is $1/2^{16} \times 40$.

Here, the False Alarm is a phenomenon where, even when a radio base station transmits no uplink scheduling grant and no downlink scheduling information to a mobile station, the mobile station determines that an uplink scheduling grant or a downlink scheduling information is transmitted to the mobile station itself.

In the case of a resource assignment by the Dynamic scheduling, for example, the influence of the False Alarm is small because the resource assignment by the uplink scheduling grant or the downlink scheduling information is basically limited in the applicable sub-frame.

In the case of a resource assignment by the Persistent scheduling, however, the influence of the False Alarm is considerable. This is because the assignment starting time is specified by the uplink scheduling grant or the downlink scheduling information, and also a radio resource is assigned periodically and persistently, starting at the assignment starting time by use of the uplink scheduling grant or the downlink scheduling information.

In particular, in the case of uplink, the mobile station performs uplink transmission even though a radio base station assigns no radio resource thereto. Thus, the uplink transmission signal becomes an interference signal which interferes with another mobile station in this case, and the characteristic features of the system degrade considerably.

Note that, the problem associated with the False Alarm described above may occur likewise also in a case of a configuration in which it is determined on the basis of a specific one bit in the PDCCH, instead of an RNTI, whether the one bit is the PDCCH giving an instruction to persistently assign a PDSCH (downlink radio resource) for the "Persistent scheduling" or the PDCCH dynamically assigning a PDSCH (downlink radio resource) for normal downlink scheduling.

In this respect, the present invention has been made in view of the aforementioned problem, and an objective of the present invention is to provide a stable and efficient mobile communication method, a mobile station, and a radio base station by reducing the probability of the occurrence of the False Alarm of uplink scheduling grants in the "Persistent scheduling".

Solution to Problem

A first aspect of the present invention is summarized as a mobile communication method in which a mobile station transmits uplink data to a radio base station in a predetermined cycle by using an uplink radio resource persistently assigned to the mobile station, the transmission starting at an assignment starting time, the method including the steps: (A1) notifying, from the radio base station to the mobile station, the predetermined cycle and information on the uplink radio resource; (B1) determining, at the mobile station, the assignment starting time, and starting the transmission of the uplink data via the uplink radio resource at the assignment starting time, when receiving a persistent assignment signal from the radio base station, wherein, in the step (B1), the mobile station discards the persistent assignment signal, when the information on the uplink radio resource and information notified by the persistent assignment signal are inconsistent with each other.

In the other words, the first aspect of the present invention is summarized as a mobile communication method in which a mobile station transmits uplink data to a radio base station by using an uplink radio resource assigned to the mobile station by predetermined scheduling information, in a predetermined cycle, the method including the steps: (A2) notifying, to the mobile station, the predetermined cycle and information on the uplink radio resource; (B2) notifying, to the mobile station, the predetermined scheduling information; and (C2) transmitting uplink data in the predetermined cycle by using the uplink radio resource assigned by the predetermined scheduling information, the transmission starting at a certain point determined on the basis of the received predetermined scheduling information, wherein, in the step (C2), the predetermined scheduling information is discarded, when the information on the uplink radio resource and information notified by the predetermined scheduling information are inconsistent with each other.

In the first aspect, the predetermined cycle and the information on the uplink radio resource can be notified by an RRC message; and the persistent assignment signal can be notified by a downlink control channel.

In the other words, in the first aspect, in the step (A2), the predetermined cycle and the information on the uplink radio resource can be notified by an RRC message; and in the step (B2), the predetermined scheduling information can be transmitted to the mobile station via a downlink control channel.

In the first aspect, a range of information to be specified by the persistent assignment signal can be limited by the information on the uplink radio resource; and in the step (B1), when information notified by the persistent assignment signal is not within the limited range of information to be specifiable by the persistent assignment signal, the mobile station can determine that the information on the uplink radio resource and the information notified by the persistent assignment signal are inconsistent with each other.

In the other words, in the first aspect, in the step (A2), a range of information specifiable by the predetermined scheduling information can be limited by the information on the uplink radio resource; and in the step (C2), when information included in the predetermined scheduling information is not within the range limited by the information on the uplink radio resource, the information on the uplink radio resource and the information notified by the predetermined scheduling information can be determined to be inconsistent with each other.

In the first aspect, the persistent assignment signal, in the other words, the predetermined scheduling information can include at least one of resource block assignment information, a modulation scheme, a data size, MCS information, transmission format information, transmission power control information, information on Cyclic Shift of Demodulation RS, and a CQI request.

A second aspect of the present invention is summarized as a mobile communication method in which a mobile station transmits uplink data to a radio base station by using an uplink radio resource assigned to the mobile station by predetermined scheduling information, in a predetermined cycle, the method including the steps of: (A) notifying, to the mobile station, the predetermined cycle and information on the uplink radio resource; (B) notifying, to the mobile station, the predetermined scheduling information; and (C) transmitting uplink data in the predetermined cycle by using the uplink radio resource assigned by the predetermined scheduling information, the transmission starting at a certain point determined on the basis of the received predetermined scheduling information, wherein the step (C) is performed when information included in the predetermined scheduling information coincides with a previously specified content.

In the second aspect, the predetermined scheduling information can include at least one of resource block assignment information, a modulation scheme, a data size, MCS information, transmission format information, transmission power control information, information on Cyclic Shift of Demodulation RS, and a CQI request.

A third aspect of the present invention is summarized as a mobile station configured to transmit uplink data to a radio base station in a predetermined cycle by using an uplink radio resource persistently assigned to the mobile station, the transmission starting at an assignment starting time, the mobile station including: a persistent communication information receiver unit configured to receive the predetermined cycle and information on the uplink radio resource from the radio base station; and a communication unit configured to determine the assignment starting time, and to start the transmission of the uplink data via the uplink radio resource at the assignment starting time, when receiving a persistent assignment signal from the radio base station, wherein the communication unit is configured to discard the persistent assignment signal, when the information on the uplink radio resource and information notified by the persistent assignment signal are inconsistent with each other.

In the other words, the third aspect of the present invention is summarized as a mobile station configured to transmit uplink data to a radio base station by using an uplink radio resource assigned to the mobile station by predetermined scheduling information, in a predetermined cycle, the mobile station including: a receiver unit configured to receive the predetermined cycle and information on the uplink radio resource from the radio base station; and a communication unit configured to transmit uplink data in the predetermined cycle by using the uplink radio resource assigned by the predetermined scheduling information, the transmission starting at a certain point determined on the basis of the predetermined scheduling information received from the radio base station, wherein the communication unit is configured to discard the predetermined scheduling information, when the information on the uplink radio resource and information notified by the predetermined scheduling information are inconsistent with each other.

In the third aspect, the predetermined cycle and the information on the uplink radio resource can be notified by an RRC message; and the persistent assignment signal can be notified by a downlink control channel.

In the other words, in the third aspect, the receiver unit can be configured to receive the predetermined cycle and the information on the uplink radio resource via an RRC message; and the communication unit can be configured to receive the predetermined scheduling information via a downlink control channel.

In the third aspect, the communication unit can be configured to determine that the information on the uplink radio resource and the information notified by the predetermined scheduling information are inconsistent with each other, when information included in the predetermined scheduling information is not within a range of information specifiable by the predetermined scheduling information, the range limited by the information on the uplink radio resource.

In the third aspect, the persistent assignment signal, in the other words, the predetermined scheduling information can include at least one of resource block assignment information, a modulation scheme, a data size, MCS information, transmission format information, transmission power control information, information on Cyclic Shift of Demodulation RS, and a CQI request.

A fourth aspect of the present invention is summarized as a mobile station configured to transmit uplink data to a radio base station by using an uplink radio resource assigned to the mobile station by predetermined scheduling information, in a predetermined cycle, the mobile station including: a receiver unit configured to receive the predetermined cycle and information on the uplink radio resource from the radio base station; and a communication unit configured to transmit uplink data in the predetermined cycle by using the uplink radio resource assigned by the predetermined scheduling information, the transmission starting at a certain point determined on the basis of the predetermined scheduling information received from the radio base station, wherein the communication unit is configured to transmit the uplink data, when information notified by the predetermined scheduling information coincides with a previously specified content.

In the fourth aspect, the predetermined scheduling information can include at least one of resource block assignment information, a modulation scheme, a data size, MCS information, transmission format information, transmission power control information, information on Cyclic Shift of Demodulation RS, and a CQI request.

A fifth aspect of the present invention is summarized as a radio base station to be used in a mobile communication method in which a mobile station transmits uplink data to the radio base station in a predetermined cycle by using an uplink radio resource persistently assigned to the mobile station, the transmission starting at an assignment starting time, the radio base station includes: a persistent communication information transmitter unit configured to notify, to the mobile station, the predetermined cycle and information on the uplink radio resource; a persistent assignment signal transmitter unit configured to transmit the persistent assignment signal to the mobile station; and communication unit configured to start reception of the uplink data via the uplink radio resource at the assignment starting time determined by the persistent assignment signal, wherein the persistent communication information transmitter unit configured to notify information limiting a range of information to be specifiable by the persistent assignment signal, as the information on the uplink radio resource.

In the other words, the fifth aspect of the present invention is summarized as a radio base station used in a mobile communication system in which a mobile station transmits uplink data to a radio base station by using an uplink radio resource assigned to the mobile station by predetermined scheduling information, in a predetermined cycle, the radio base station including: a first transmitter unit configured to notify, to the mobile station, the predetermined cycle and information on the uplink radio resource; a second transmitter unit configured to transmit the predetermined scheduling information to the mobile station; and a communication unit configured to receive uplink data transmitted in the predetermined cycle by using the uplink radio resource assigned by the predetermined scheduling information, wherein the first transmitter unit is configured to notify, to the mobile station, information limiting a range of information specifiable by the predetermined scheduling information, as the information on the uplink radio resource.

In the fifth aspect, the predetermined cycle and the information on the uplink radio resource can be notified by an RRC message; and the persistent assignment signal can be notified by a downlink control channel.

In the other words, in the fifth aspect, the first transmitter unit can be configured to notify, to the mobile station, the predetermined cycle and the information on the uplink radio resource via an RRC message; and the second transmitter unit can be configured to notify, to the mobile station, the predetermined scheduling information via a downlink control channel.

In the fifth aspect, the persistent assignment signal, in the other words, the predetermined scheduling information can include at least one of resource block assignment information, a modulation scheme, a data size, MCS information, transmission format information, transmission power control information, information on Cyclic Shift of Demodulation RS, and a CQI request.

In the fifth aspect, the first transmitter unit can be configured to determine the range on the basis of a data type.

Advantageous Effects of Invention

As described above, the present invention is capable of reducing the probability of the occurrence of the False Alarm of uplink scheduling grants in the "Persistent scheduling". As a result, the present invention is capable of providing a stable and efficient mobile communication method, a mobile station, and a radio base station.

BRIEF DESCRIPTION OF DRAWINGS

FIG. 1 is a functional block diagram of a mobile station according to a first embodiment of the present invention.

FIG. 2 is a diagram for illustrating an uplink scheduling grant in a mobile communication system according to the first embodiment of the present invention.

FIG. 3 is a diagram for illustrating scheduling performed in the mobile communication system according to the first embodiment of the present invention.

FIG. 5 is a flowchart showing operations of the mobile station according to the first embodiment of the present invention.

Figure 4:
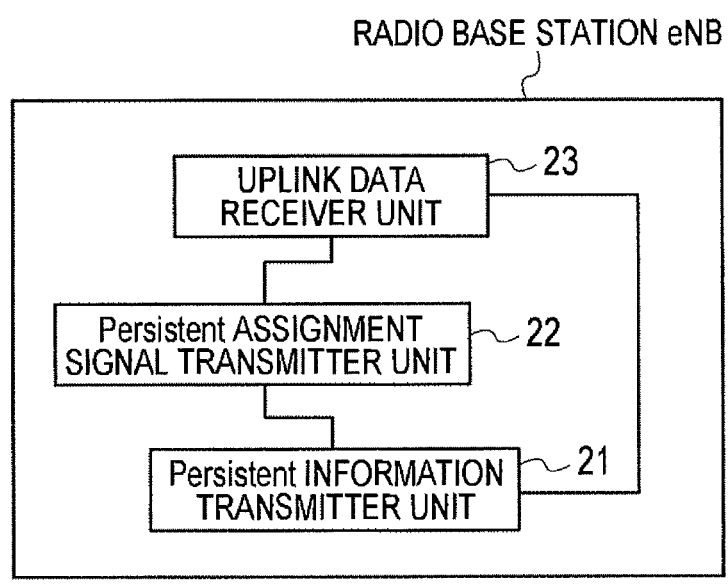
FIG. 4 is a functional block diagram of a radio base station according to the first embodiment of the present invention.

DESCRIPTION OF EMBODIMENTS (Configuration of Mobile Communication System According to First Embodiment of Present Invention)

Referring to FIG. 1, a configuration of a mobile communication system according to a first embodiment of the present invention is described. In this embodiment, a description is given using a mobile communication system of the LTE scheme as an example, but the present invention is also applicable to mobile communication systems of other modes.

In the mobile communication system according to the embodiment, a mobile station UE is configured to transmit uplink data to a radio base station eNB in a predetermined cycle by using a PUSCH (uplink radio resource) persistently assigned, the transmission starting at an assignment starting time.

Specifically, in the mobile communication system according to this embodiment, a mobile station UE is configured to transmit uplink data to a radio base station by using an uplink radio resource assigned thereto in a predetermined cycle by predetermined scheduling information.

As shown in FIG. 1, the mobile station UE includes a Persistent information receiver unit 11, a Persistent assignment signal receiver unit 12, and an uplink data transmitter unit 13.

The Persistent information receiver unit 11 is configured to receive, from the radio base station eNB, Persistent information including the predetermined cycle and the information on the uplink radio resource.

In addition, the Persistent information receiver unit 11 is configured to notify, to the Persistent assignment signal receiver unit 12, the information on the uplink radio resource.

Specifically, the Persistent information receiver unit 11 is configured to acquire the Persistent information, on the basis of an RRC message transmitted by the radio base station eNB.

Here, the information on an uplink radio resource is, for example, information for limiting a range of information to be notified by a persistent assignment signal (i.e., predetermined scheduling information) to be described later, i.e., a PDCCH (uplink scheduling grant) giving an instruction of persistent assignment of a PUSCH (uplink radio resource) for the "Persistent scheduling".

Hereinafter, a description will be further given in detail.

The information elements of the PDCCH (uplink scheduling grant) giving the instruction of persistent assignment are information elements as shown in FIG. 2, for example.

"Format Indicator" is information indicating whether the PDCCH is information for uplink or information for downlink. The information for downlink is also called simplified downlink control information.

"Hopping flag" is information indicating whether or not hopping is applied to an uplink signal the transmission of which is instructed by the PDCCH.

"RB assignment information" is information indicating resource block assignment information for the uplink signal the transmission of which is instructed by the PDCCH.

"MCS information" is information on an MCS for the uplink signal the transmission of which is instructed by the PDCCH. Here, the information on the MCS is information such as a data size, a modulation scheme, and a Redundancy Version parameter in HARQ, for example.

"New Data Indicator" is information indicating whether the uplink signal the transmission of which is instructed by the PDCCH is for new transmission or retransmission.

"TPC" is information for uplink transmission power control for the uplink signal specified by the PDCCH.

"Cyclic shift for DMRS" is information on "Cyclic shift" of "Demodulation Reference signal" for the uplink signal specified by the PDCCH.

"CQI request" is information giving an instruction to transmit a CQI in the uplink.

"RNTI/CRC" is CRC bits masked by an "UE-ID (RNTI)".

Note that, the aforementioned information elements of the PDCCH (uplink scheduling grant) are examples, and an information element other than the aforementioned information elements may be included in the PDCCH or some of the aforementioned information elements may not be included in the PDCCH.

In addition, the information on the uplink radio resource may be information for limiting the range of information to be notified by the aforementioned PDCCH (uplink scheduling grant) as described below.

For example, the information on the uplink radio resource may be information for limiting the range of information to be notified by the aforementioned "RB assignment information".

More specifically, the information on the uplink radio resource may be information for limiting the number of resource blocks to be notified by the aforementioned "RB assignment information".

Further, the information on the uplink radio resource may be information for limiting the number of resource blocks to be notified by the aforementioned "RB assignment information" to "2" or "3".

In this case, when the number of resource blocks notified by the PDCCH (uplink scheduling grant) is neither "2" nor "3", the information on the uplink radio resource and the information (RB assignment information) notified by the PDCCH (uplink scheduling grant) are inconsistent with each other.

Further, the information on the uplink radio resource may be information for limiting the number of resource blocks to be notified by the aforementioned "RB assignment information" to "3" or less.

Specifically, the information on the uplink radio resource may be information to indicate the maximum value of the number of resource blocks to be notified by the aforementioned "RB assignment information".

In this case, when the number of resource blocks notified by the PDCCH (uplink scheduling grant) is larger than "3", the information on the uplink radio resource and the information (RB assignment information) notified by the PDCCH (uplink scheduling grant) are inconsistent with each other.

Note that, the information on the uplink radio resource indicates the maximum value of the number of resource blocks notified by the aforementioned "RB assignment information" in the aforementioned example, but the information on the uplink radio resource may indicate the minimum value of the number of resource blocks instead.

Alternatively, the information on the uplink radio resource may indicate both the maximum and minimum values of the number of resource blocks to be notified by the aforementioned "RB assignment information".

For example, the information on the uplink radio resource may indicate "10" as the maximum value of the number of resource blocks to be notified by the aforementioned "RB assignment information" and indicate "5" as the minimum value of the resource blocks.

In this case, when the number of resource blocks notified by the PDCCH (uplink scheduling grant) is larger than "10" or the number of the resource blocks is smaller than "5", the information on the uplink radio resource and the information (RB assignment information) notified by the PDCCH (uplink scheduling grant) are inconsistent with each other.

Further, as far as the information on the uplink radio resource limits the range of information to be notified by the aforementioned "RB assignment information", the method for limiting the range is not limited to the aforementioned "limitation of the number of resource blocks", and the information may limit, by use of another limitation method, the range of information to be notified by the aforementioned "RB assignment information".

For example, the information on the uplink radio resource may be information for limiting a position in a frequency direction of a resource block to be notified by the aforementioned "RB assignment information".

Alternatively, the information on the uplink radio resource may be information for limiting information to be notified by the aforementioned "MCS information", for example. The information on the uplink radio resource may be information for limiting the range of a modulation scheme, a data size, or the like, for example.

More specifically, the information on the uplink radio resource may be information for limiting the modulation scheme to be notified by the aforementioned "MCS information".

For example, the information on the uplink radio resource may be information for limiting the modulation scheme to be notified by the aforementioned "MCS information" to "QPSK".

In this case, when the modulation scheme notified by the PDCCH (uplink scheduling grant) is other than "QPSK", for example, when the modulation scheme is "16QAM", the information on the uplink radio resource and the information (MCS information) notified by the PDCCH (uplink scheduling grant) are inconsistent with each other.

Note that, the aforementioned example illustrates an example in which the information on the uplink radio resource limits the modulation scheme to be notified by the "MCS information" to "QPSK". However, the information on the uplink radio resource may limit the modulation scheme to be notified by the "MCS information" to "16QAM", to "64QAM", or to the both of "QPSK" and "16QAM", instead.

More specifically, the information on the uplink radio resource may indicate whether it is applied or not on each of the modulation schemes, "QPSK", "16QAM", and "64QAM" to be notified by the "MCS information".

Alternatively, the information on the uplink radio resource may be information for limiting a data size to be notified by the "MCS information", for example.

For example, the information on the uplink radio resource may be information for limiting the data size to be notified by the "MCS information" to "320 bits".

In this case, when the data size notified by the PDCCH (uplink scheduling grant) is other than "320 bits", e.g., when the data size is "512 bits", the information on the uplink radio resource and the information (MCS information) notified by the PDCCH (uplink scheduling grant) are inconsistent with each other.

Note that, the aforementioned value, "320 bits", is only an example, and the number of bits other than "320 bits" may be specified.

In addition, one kind of data size is specified in the aforementioned example, but two or more kinds of data sizes may be specified.

Specifically, the information on the uplink radio resource maybe information for limiting the data size notified by the "MCS information" to "320 bits" and "640 bits", for example.

Alternatively, the information on the uplink radio resource may be information for limiting the data size notified by the "MCS information" to "320 bits" or less, for example.

In this case, when the data size notified by the PDCCH (uplink scheduling grant) is larger than "320 bits", e.g., when the data size is "512 bits", the information on the uplink radio resource and the information (MCS information) notified by the PDCCH (uplink scheduling grant) are inconsistent with each other.

Note that, the aforementioned value, "320 bits", is only an example, and the number of bits other than "320 bits" may be specified. In addition, the maximum value of the data size is specified in the aforementioned example, but the minimum value of the data size may be specified, instead.

Alternatively, both of the maximum value and the minimum value of the data size may be specified. For example, "640 bits" may be specified as the maximum value of the data size, and "320 bits" may be specified as the minimum value of the data size.

In this case, when the data size notified by the PDCCH (uplink scheduling grant) is larger than "640 bits" or the data size is smaller than "320 bits", the information on the uplink radio resource and the information (MCS information) notified by the PDCCH (uplink scheduling grant) are inconsistent with each other.

Note that, the aforementioned example shows a case where the information notified by "RB assignment information" or the information notified by "MCS information" is limited by the information on the uplink radio resource, but an information element other than the aforementioned elements may be limited by the information on the uplink radio resource by the same method, instead.

In addition, "RB assignment information" or "MCS information" described above is information relating to resource blocks, or information relating to a modulation scheme or a data size, so that "RB assignment information" or "MCS information" may be called "information relating to transmission format".

The Persistent assignment signal receiver unit 12 is configured to receive a persistent assignment signal from the radio base station eNB.

Specifically, the Persistent assignment signal receiver unit 12 is configured to receive, from the radio base station eNB, PDCCH (uplink scheduling grant), as a persistent assignment signal, the PDCCH (uplink scheduling grant) being transmitted to the mobile station itself and giving an instruction to persistently assign a PUSCH (uplink radio resource) for the "Persistent scheduling".

For example, the Persistent assignment signal receiver unit 12 may be configured to determine, on the basis of an RNTI or the like set in a PDCCH, whether or not a PDCCH (uplink scheduling grant) giving an instruction of persistent assignment of a PUSCH (uplink radio resource) for the "Persistent scheduling" is transmitted to the mobile station itself.

Instead, the Persistent assignment signal receiver unit 12 may be configured to determine, on the basis of an RNTI or the like set in a PDCCH, whether or not the received PDCCH is a PDCCH dynamically assigning a PUSCH (uplink radio resource), i.e., an uplink scheduling grant for the dynamic scheduling.

Here, consider a case where, as a Persistent scheduling method in the LTE scheme, it is defined to determine on the basis of one specific bit in a PDCCH whether the PDCCH is a PDCCH (uplink scheduling grant) giving an instruction of persistent assignment of a PUSCH (uplink radio resource) for the "Persistent scheduling", or a PDCCH dynamically assigning a PUSCH (uplink radio resource), i.e., an uplink scheduling grant for the Dynamic scheduling. In this case, the Persistent assignment signal receiver unit 12 may be configured to determine on the basis of the one bit whether the PDCCH is a PDCCH (uplink scheduling grant) giving an instruction of persistent assignment of a PUSCH (uplink radio resource) for the "Persistent scheduling", or a PDCCH dynamically assigning a PUSCH (uplink radio resource), i.e., an uplink scheduling grant for the Dynamic scheduling.

Alternatively, consider a case where, as a Persistent scheduling method in an LTE scheme, it is defined that a part of the information elements in a PDCCH indicates whether the PDCCH is a PDCCH (uplink scheduling grant) giving an instruction of persistent assignment of a PUSCH (uplink radio resource) for the "Persistent scheduling", or a PDCCH dynamically assigning a PUSCH (uplink radio resource), i.e., an uplink scheduling grant for Dynamic scheduling. In this case, the Persistent assignment signal receiver unit 12 may be configured to determine on the basis of the part of the information elements in the PDCCH whether the PDCCH is a PDCCH (uplink scheduling grant) giving an instruction of persistent assignment of a PUSCH (uplink radio resource) for the "Persistent scheduling", or a PDCCH dynamically assigning a PUSCH (uplink radio resource), i.e., an uplink scheduling grant for Dynamic scheduling.

In addition, the Persistent assignment signal receiver unit 12 is configured to receive information on the uplink radio resource from the Persistent information receiver unit 11.

Here, the information on an uplink radio resource is, as described above, the information for limiting a range of information to be notified by the persistent assignment signal, i.e., a PDCCH (uplink scheduling grant) giving an instruction of persistent assignment of a PUSCH (uplink radio resource) for the "Persistent scheduling".

Further, the Persistent assignment signal receiver unit 12 determines whether or not the information on the uplink radio resource and the information to be notified by the persistent assignment signal, i.e., the PDCCH (uplink scheduling grant) giving an instruction of persistent assignment of a PUSCH (uplink radio resource) for the "Persistent scheduling" are inconsistent with each other.

When the Persistent assignment signal receiver unit 12 determines that the information on the uplink radio resource and the information to be notified by the persistent assignment signal, i.e., the PDCCH (uplink scheduling grant) giving an instruction of persistent assignment of a PUSCH (uplink radio resource) for the "Persistent scheduling" are inconsistent with each other, the Persistent assignment signal receiver unit 12 discards the persistent assignment signal, i.e., the PDCCH (uplink scheduling grant) giving an instruction of persistent assignment of a PUSCH (uplink radio resource) for the "Persistent scheduling", which the Persistent assignment signal receiver unit 12 has determined as the signal transmitted to the mobile station itself.

Specifically, in this case, the Persistent assignment signal receiver unit 12 regards that the information notified by the persistent assignment signal, i.e., the PDCCH (uplink scheduling grant) giving an instruction of persistent assignment of a PUSCH (uplink radio resource) for the "Persistent scheduling" has not been transmitted to the mobile station itself.

In the aforementioned processing, the Persistent assignment signal receiver unit 12 provides the uplink data transmitter unit 13 with the persistent assignment signal which is not discarded, i.e., the PDCCH (uplink scheduling grant) giving an instruction of persistent assignment of a PUSCH (uplink radio resource) for the "Persistent scheduling".

Hereinafter, an example will be shown of the processing as described above to discard the persistent assignment signal, i.e., the PDCCH (uplink scheduling grant) giving an instruction of persistent assignment of a PUSCH (uplink radio resource) for the "Persistent scheduling".

Consider a case where the information on the uplink radio resource is information to limit the number of resource blocks to be notified by the "RB assignment information" to "2" or "3", for example. When the number of resource blocks notified by the PDCCH (uplink scheduling grant) is neither "2" nor "3" in this case, the Persistent assignment signal receiver unit 12 determines that the information on the uplink radio resource and the information (RB assignment information) notified by the PDCCH (uplink scheduling grant) are inconsistent with each other. Thus, the PDCCH (uplink scheduling grant) is discarded.

Alternatively, consider a case where the information on the uplink radio resource is information to limit the number of resource blocks to be notified by the "RB assignment information" to "3" or less, for example. When the number of resource blocks notified by the PDCCH (uplink scheduling grant) is larger than "3" in this case, e.g., when the number of resource blocks is "5", the Persistent assignment signal receiver unit 12 determines that the information on the uplink radio resource and the information (RB assignment information) notified by the PDCCH (uplink scheduling grant) are inconsistent with each other. Thus, the PDCCH (uplink scheduling grant) is discarded.

Alternatively, consider a case where the information on the uplink radio resource is information to limit the number of resource blocks to be notified by the "RB assignment information" to "10" or less, but at least "5", for example. When the number of resource blocks notified by the PDCCH (uplink scheduling grant) is larger than "10" or smaller than "5" in this case, e.g., when the number of resource blocks is "12", the Persistent assignment signal receiver unit 12 determines that the information on the uplink radio resource and the information (RB assignment information) notified by the PDCCH (uplink scheduling grant) are inconsistent with each other. Thus, the PDCCH (uplink scheduling grant) is discarded.

Alternatively, consider a case where the information on the uplink radio resource is information to limit the modulation scheme to be notified by the "MCS information" to "QPSK", for example. When the modulation scheme notified by the PDCCH (uplink scheduling grant) is not "QPSK" in this case, e.g., when the modulation scheme is "16QAM", the Persistent assignment signal receiver unit 12 determines that the information on the uplink radio resource and the information (MCS information) notified by the PDCCH (uplink scheduling grant) are inconsistent with each other. Thus, the PDCCH (uplink scheduling grant) is discarded.

Alternatively, consider a case where the information on the uplink radio resource is information to limit the data size to be notified by the "MCS information" to "320 bits", for example.

When the data size notified by the PDCCH (uplink scheduling grant) is not "320 bits" in this case, e.g., when the data size is "1024 bits", the Persistent assignment signal receiver unit 12 determines that the information on the uplink radio resource and the information (MCS information) notified by the PDCCH (uplink scheduling grant) are inconsistent with each other. Thus, the PDCCH (uplink scheduling grant) is discarded.

Alternatively, consider a case where the information on the uplink radio resource is information to limit the data size to be notified by the "MCS information" to "320 bits" or less, for example. When the data size notified by the PDCCH (uplink scheduling grant) is larger than "320 bits" in this case, e.g., when the data size is "512 bits", the Persistent assignment signal receiver unit 12 determines that the information on the uplink radio resource and the information (MCS information) notified by the PDCCH (uplink scheduling grant) are inconsistent with each other. Thus, the PDCCH (uplink scheduling grant) is discarded.

Alternatively, consider a case where the information on the uplink radio resource is information to limit the data size to be notified by the "MCS information" to "640 bits" or less, but at least "320 bits", for example. When the data size notified by the PDCCH (uplink scheduling grant) is larger than "640 bits", or smaller than "320 bits" in this case, e.g., when the data size is "1024 bits", the Persistent assignment signal receiver unit 12 determines that the information on the uplink radio resource and the information (MCS information) notified by the PDCCH (uplink scheduling grant) are inconsistent with each other. Thus, the PDCCH (uplink scheduling grant) is discarded.

Note that, in the aforementioned example, the Persistent assignment signal receiver unit 12 determines whether or not the information on the uplink radio resource and the information to be notified by the persistent assignment signal, i.e., the PDCCH (uplink scheduling grant) giving an instruction of persistent assignment of a PUSCH (uplink radio resource) for the "Persistent scheduling" are inconsistent with each other. Instead, the Persistent assignment signal receiver unit 12 may determine whether or not an inconsistency other than the aforementioned inconsistencies exists. Then, when determining that such an inconsistency exists, the Persistent assignment signal receiver unit 12 may discard the persistent assignment signal, i.e., the PDCCH (uplink scheduling grant) giving an instruction of persistent assignment of a PUSCH (uplink radio resource) for the "Persistent scheduling".

For example, consider a case where the mobile station does not have a capability to support uplink "64QAM" transmission. When the Persistent assignment signal receiver unit 12 is given an instruction for "64QAM" transmission by the persistent assignment signal, i.e., the PDCCH (uplink scheduling grant) giving an instruction of persistent assignment of a PUSCH (uplink radio resource) for the "Persistent scheduling" in this case, the Persistent assignment signal receiver unit 12 may discard the persistent assignment signal, i.e., the PDCCH (uplink scheduling grant) giving an instruction of persistent assignment of a PUSCH (uplink radio resource) for the "Persistent scheduling".

Alternatively, consider a case where the mobile station has a capability to allow the maximum transmittable data size of "10000 bits". When the Persistent assignment signal receiver unit 12 is given an instruction for transmission of an uplink signal with a data size of "20000 bits" by the persistent assignment signal, i.e., the PDCCH (uplink scheduling grant) giving an instruction of persistent assignment of a PUSCH (uplink radio resource) for the "Persistent scheduling", the Persistent assignment signal receiver unit 12 may discard the persistent assignment signal, i.e., the PDCCH (uplink scheduling grant) giving an instruction of persistent assignment of a PUSCH (uplink radio resource) for the "Persistent scheduling".

Meanwhile, generally, there is a bit pattern having no meaning as information in the persistent assignment signal, i.e., the PDCCH (uplink scheduling grant) giving an instruction of persistent assignment of a PUSCH (uplink radio resource) for the "Persistent scheduling".

Accordingly, when some bit pattern of the persistent assignment signal, i.e., the PDCCH (uplink scheduling grant) giving an instruction of persistent assignment of a PUSCH (uplink radio resource) for the "Persistent scheduling" has no meaning as information, the Persistent assignment signal receiver unit 12 may discard the persistent assignment signal, i.e., the PDCCH (uplink scheduling grant) giving an instruction of persistent assignment of a PUSCH (uplink radio resource) for the "Persistent scheduling".

Note that, the expression "a bit pattern has no meaning as information" may be expressed differently that the bit pattern is not supposed to be notified.

In this case, the Persistent assignment signal receiver unit 12 may determine, regardless of the information on the uplink radio resource, whether or not some bit pattern of the persistent assignment signal, i.e., of the PDCCH (uplink scheduling grant) giving an instruction of persistent assignment of a PUSCH (uplink radio resource) for the "Persistent scheduling" has meaning as information as described above.

Alternatively, the Persistent assignment signal receiver unit 12 may determine whether or not some bit pattern of the persistent assignment signal, i.e., of the PDCCH (uplink scheduling grant) giving an instruction of persistent assignment of a PUSCH (uplink radio resource) for the "Persistent scheduling" has meaning as information as described above, in a case where the information on the uplink radio resource does not exist.

Here, an example of the aforementioned "bit pattern not supposed to be notified" will be described.

For example, when the value of the number of RBs indicated by "RB assignment information" shown in FIG. 2 is defined to be always "10" or less in the persistent assignment signal, a bit pattern indicating a value larger than "10" as the number of RBs shown by the "RB assignment information" is considered to be a bit pattern not supposed to be notified.

Specifically, the mobile station UE discards the persistent assignment signal, when the value of the number of RBs indicated by the "RB assignment information" in the persistent assignment signal is larger than "10".

Alternatively, in a case where the value of the data size indicated by "MCS information" shown in FIG. 2 is defined to be always "1000" or less in the persistent assignment signal, for example, a bit pattern indicating a value larger than "1000" as the data size shown by the "MCS information" is considered to be a bit pattern not supposed to be notified.

Specifically, the mobile station UE discards the persistent assignment signal, when the value of the data size indicated by the "MCS information" in the persistent assignment signal is larger than "1000".

Note that, the 'case where the value of the data size indicated by the "MCS information" is larger than "1000"' may mean that a part of bits of the "MCS information" is not a predetermined value, for example. In a case where the data size is defined by a four-digit binary number (described as "abcd" hereinafter where the first digit "a" corresponds to the "Most Significant bit"), the data size is described as follows when expressed by a decimal number.

(Data size expressed by a decimal number)=$2^3 \times a + 2^2 \times b + 2^1 \times c + 2^0 \times d$ Here, when "a", which is the "Most Significant bit", is not "0", i.e., when "a" is "1", the data size is at least "8".

Specifically, the mobile station UE may discard the persistent assignment signal, when a part of the bits of the "MCS information" in the persistent assignment signal is not a predetermined value.

More specifically, the mobile station UE may discard the persistent assignment signal, when the "Most Significant bit" of the "MCS information" in the persistent assignment signal is not a predetermined value (when the "Most Significant bit" is not "0" in the aforementioned example, for example), or a predetermined number of bits consecutive from the "Most Significant bit" are not a predetermined value (for example, when neither "a" nor "b" is "0", suppose that the values of two consecutive bits are not a predetermined value in the aforementioned example).

Note that, the same processing may be applied when the "MCS information" indicates both of the data size and modulation scheme.

Alternatively, when the modulation scheme indicated by the "MCS information" shown in FIG. 2 is defined to be always "QPSK" in the persistent assignment signal, for example, a bit pattern indicating "16QAM" or "64QAM" as the modulation scheme shown by the "MCS information" is considered to be a bit pattern not supposed to be notified.

Specifically, the mobile station UE discards the persistent assignment signal, when the modulation scheme indicated by the "MCS information" in the persistent assignment signal is not "QPSK".

Alternatively, the persistent assignment signal is basically a signal giving an instruction for new transmission. Thus, a bit pattern specifying a modulation scheme used in retransmission in the "MCS information", for example, is considered to be a bit pattern not supposed to be notified.

Specifically, the mobile station UE discards the persistent assignment signal, when the "MCS information" in the persistent assignment signal indicates a bit pattern specifying a modulation scheme used in retransmission.

Alternatively, when it is defined that "1" is always set in the persistent assignment signal as the value of "TPC" shown in FIG. 2, for example, "0" as the value of "TPC" is considered to be a bit pattern not supposed to be notified.

Specifically, the mobile station UE discards the persistent assignment signal, when the value of "TPC" in the persistent assignment signal is "0".

Note that, the number of bits for "TPC" is "1" in the aforementioned example, but the number of bits may be other than "1", e.g., "2" or "3". For example, when the number of bits for "TPC" is "2", and it is defined that "11" is always set as the value of TPC, bit patterns "10", "01", and "00" are considered to be bit patterns not supposed to be notified.

Alternatively, when it is defined that "1" is always set as the value of "Cyclic Shift for DMRS" shown in FIG. 2 in the persistent assignment signal, for example, "0" as the value of the "Cyclic Shift for DMRS" is considered to be a bit pattern not supposed to be notified.

Specifically, the mobile station UE discards the persistent assignment signal, when the value of the "Cyclic Shift for DMRS" in the persistent assignment signal is "0".

Note that, the number of bits for the "Cyclic Shift for DMRS" in the aforementioned example is "1", but the number of bits may be a value other than "1", e.g., "2" or "3".

Alternatively, when it is defined that "1" is always set as the value of "CQI request" shown in FIG. 2 in the persistent assignment signal, for example, "0" as the value of the "CQI request" is considered to be a bit pattern not supposed to be notified.

Specifically, the mobile station UE discards the persistent assignment signal, when the value of the "CQI request" in the persistent assignment signal is "0".

Alternatively, when it is defined that "1" is always set as the value of "New Data Indicator" shown in FIG. 2 in the persistent assignment signal, for example, "0" as the value of the "New Data Indicator" is considered to be a bit pattern not supposed to be notified.

Specifically, the mobile station UE discards the persistent assignment signal, when the value of the "New Data Indicator" in the persistent assignment signal is "0".

Alternatively, the mobile station UE may identify the aforementioned "bit pattern not supposed to be notified", on the basis of information in a persistent assignment signal received in the past.

For example, when the data size indicated by "MCS information" in a persistent assignment signal received in the past is always "320 bits", the mobile station UE may regard a bit pattern indicating a data size other than "320 bits" as a bit pattern not supposed to be notified.

Here, for example, it is considered that "False Alarm" happens when the mobile station UE is in a state where it has not received a correct persistent assignment signal even once in the past. Consider a case where the mobile station UE has received a persistent assignment signal having the same data size at least "three times" in the past. In this case, the mobile station UE may regard a bit pattern showing a data size other than the aforementioned data size as a bit pattern not supposed to be notified.

Alternatively, in a case where the mobiles station UE has consecutively received a persistent assignment signal having the same data size at least "three times" in the past, the mobile station UE may regard a bit pattern showing a data size other than the aforementioned data size as a bit pattern not supposed to be notified.

Note that, the numbers shown in the aforementioned example such as "320 bits" and "three times" are only examples, and the numbers may be values other than the values shown in the aforementioned example.

Note that, multiple of the aforementioned processing operations to discard the PDCCH (uplink scheduling grant) giving an instruction of persistent assignment of a PUSCH (uplink radio resource) for the "Persistent scheduling" may be applied simultaneously.

Specifically, when multiple processing operations to discard the PDCCH giving the instruction of persistent assignment are performed, and when the PDCCH is determined to be discarded in at least one of the processing operations, the processing operation to discard the PDCCH may be performed.

The uplink data transmitter unit 13 is configured to transmit uplink data to be transmitted via a PUSCH (uplink radio resource) assigned by a PDCCH.

Specifically, the uplink data transmitter unit 13 is configured to determine an uplink transmission sub-frame as the aforementioned "assignment starting time", when receiving from the Persistent assignment signal receiver unit 12, the aforementioned Persistent assignment signal, i.e., the PDCCH (uplink scheduling grant) giving the instruction of persistent assignment of a PUSCH (uplink radio resource) for the "Persistent scheduling", the uplink transmission sub-frame specified by the PDCCH. The uplink data transmitter unit 13 is configured then to start persistent transmission of the uplink data via the PUSCH (uplink radio resource) for the "Persistent scheduling" in the aforementioned "predetermined cycle" at the "assignment starting time".

In the example shown in FIG. 3, the uplink data transmitter unit 13 is configured to transmit, once the Persistent assignment signal receiver unit 12 has received the persistent assignment signal in a sub-frame #3 via the PDCCH, the uplink data via a PUSCH (uplink radio resource) mapped to a resource block (aggregate of sub-carriers) in an uplink transmission sub-frame #7 specified by the PDCCH.

Furthermore, the uplink data transmitter unit 13 is configured to transmit uplink data via a PUSCH (uplink radio resource) mapped to a resource block (aggregate of sub-carriers) specified by the PDCCH in the cycle of 20 ms, the transmission starting at the sub-frame #7.

That is, the uplink data transmitter unit 13 is configured to transmit uplink data via a PUSCH (uplink radio resource) mapped to a resource block (aggregate of sub-carriers) specified by the PDCCH in sub-frames #7, #27, #47, . . . .

On the other hand, the radio base station eNB according to the present invention is configured to notify, to the mobile station UE, the predetermined cycle and the information on an uplink radio resource.

Since the description related to such information as the information on the uplink radio resource is the same as the description given for the mobile station UE, the description thereof is omitted herein.

As shown in FIG. 4, the radio base station eNB includes a Persistent information transmitter unit 21, a Persistent assignment signal transmitter unit 22, and an uplink data receiver unit 23.

The Persistent information transmitter unit 21 is configured to transmit, to the mobile station UE, Persistent information (persistent communication information) including the predetermined cycle and information on an uplink radio resource.

Specifically, the Persistent information transmitter unit 21 is configured to notify, to the mobile station UE, the Persistent information by using an RRC message.

Here, the information on the uplink radio source is the information for limiting a range of information to be notified by a persistent assignment signal, i.e., a PDCCH (uplink scheduling grant) giving an instruction of persistent assignment of a PUSCH (uplink radio resource) for the "Persistent scheduling".

Since the description of the information on the uplink radio resource is the same as the description given for the mobile station UE, the description thereof is omitted herein.

Here, the Persistent information transmitter unit 21 may set information on the uplink radio resource on the basis of a data type.

For example, when the data type is VoIP, the Persistent information transmitter unit 21 may set the information on the uplink radio resource to be information to limit the number of resource blocks to be notified by the "RB assignment information" to "3" or less. In addition, when the data type is streaming, the Persistent information transmitter unit 21 may set the information on the uplink radio resource to be information to limit the number of resource blocks to be notified by the "RB assignment information" to "10" or less.

Alternatively, when the data type is VoIP, the Persistent information transmitter unit 21 may set the information on the uplink radio resource to be information to limit the modulation scheme to be notified by the "MCS information" to "QPSK". In addition, when the data type is streaming, the Persistent information transmitter unit 21 may set the information on the uplink radio resource to be information to limit the modulation scheme to be notified by the "MCS information" to "QPSK" or "16QAM".

Alternatively, when the data type is VoIP, the Persistent information transmitter unit 21 may set the information on the uplink radio resource to be information to limit the data size to be notified by the "MCS information" to "320 bits". In addition, when the data type is streaming, the Persistent information transmitter unit 21 may set the information on the uplink radio resource to be information to limit the data size to be notified by the "MCS information" to "640 bits".

Specifically, how the information to be notified by the persistent assignment signal, i.e., the PDCCH (uplink scheduling grant) giving an instruction of persistent assignment of a PUSCH (uplink radio resource) for the "Persistent scheduling" is limited may be determined on the basis of a data type of data for which the resource is assigned by the Persistent scheduling.

Note that, the aforementioned "data type" may be termed as a "service type". Specifically, the "service type" is information indicating a type of packet transmission service. Thus, the "service type" may include a VoIP service, voice service, streaming service, FTP (File Transfer Protocol) service, and the like, for example.

In the aforementioned example, the Persistent information transmitter unit 21 sets information on the uplink radio resource on the basis of a "data type", but may set information on the uplink radio resource on the basis of a "contract type", a "logical channel type", a "cell type", or a "priority type" instead of the "data type".

In addition, the "contract type" shows a type of contract subscribed by the user of the mobile station UE and includes a Low Class contract or High Class contract, or a flat rate contract or volume charging contract or the like, for example.

In addition, the "cell type" shows an operation situation of the cell, and an indoor or outdoor situation, and an urban area or rural area situation are conceivable.

The "logical channel type" is a type of logical channel such as Dedicated Control Channel (DCCH) or Dedicated Traffic Channel (DTCH). Multiple channels may be further defined in the DCCH or DTCH.

Here, "Radio Bearer" means a bearer that transmits data and is defined to have a one-to-one relationship with a logical channel through which the data is transmitted. As a result, the bearer has approximately the same meaning as the logical channel.

The "priority type" is a class to categorize priorities relating to uplink and downlink data transmission into classes. For example, data with a first priority class is transmitted more preferentially than data with a second priority class.

The "priority type" may be combined with a logical channel, and then called a "Logical Channel Priority". Alternatively, the "priority type" may be defined as "Priority Class".

The Persistent assignment signal transmitter unit 22 is configured to transmit a persistent assignment signal to the mobile station UE.

Specifically, the Persistent assignment signal transmitter unit 22 is configured to transmit, to the mobile station UE, the PDCCH (uplink scheduling grant) giving an instruction of persistent assignment of a PUSCH (uplink radio resource) for the "Persistent scheduling", as a persistent assignment signal.

Note that, when it is defined that "1" is always set as the value of "TPC (refer to FIG. 2) " in the persistent assignment signal as described above, the Persistent assignment signal transmitter unit 22 may always set "1" as the value of the "TPC".

Alternatively, when it is defined that "1" is always set as the value of "Cyclic Shift for DMRS (refer to FIG. 2)" in the persistent assignment signal as described above, for example, the Persistent assignment signal transmitter unit 22 may always set "1" as the value of the "Cyclic Shift for DMRS".

Alternatively, when it is defined that "1" is always set as the value of "CQI request (refer to FIG. 2) " in the persistent assignment signal as described above, for example, the Persistent assignment signal transmitter unit 22 may always set "1" as the value of the "CQI request".

Alternatively, when it is defined that "1" is always set as the value of "New Data Indicator (refer to FIG. 2)" in the persistent assignment signal as described above, for example, the Persistent assignment signal transmitter unit 22 may always set "1" as the value of the "New Data Indicator".

The uplink data receiver unit 23 is configured to receive uplink data to be transmitted via a PUSCH (uplink radio resource) assigned by a PDCCH.

Specifically, the uplink data receiver unit 23 is configured to determine the uplink transmission sub-frame specified by the PDCCH to be the aforementioned "assignment starting time" when the aforementioned Persistent assignment signal is transmitted by the Persistent assignment signal transmitter unit 22. The uplink data receiver unit 23 is configured then to start persistent reception of the uplink data via the PUSCH (uplink radio resource) for the "Persistent scheduling" in the aforementioned "predetermined cycle", the reception starting at the "assignment starting time".

(Operation of Mobile Communication System according to First Embodiment of Present Invention)

Referring to FIG. 5, an operation of the mobile communication system according to the first embodiment of the present invention is described.

As shown in FIG. 5, in step S101, the mobile station UE receives, by way of an RRC message or the like, Persistent information including the aforementioned predetermined cycle and the information on the uplink radio resource from the radio base station eNB.

Note that, the information on the uplink radio resource is, for example, information for limiting a range of information to be notified by a persistent assignment signal, i.e., a PDCCH (uplink scheduling grant) giving an instruction of persistent assignment of a PUSCH (uplink radio resource) for the "Persistent scheduling".

The description of the information on the uplink radio resource is the same as that for the mobile station UE. Thus, the description thereof is omitted herein.

In the step S102, the mobile station UE receives the Persistent assignment signal transmitted by the radio base station eNB via the PDCCH.

More specifically, the mobile station UE receives, as the persistent assignment signal, a PDCCH (uplink scheduling grant) giving an instruction of persistent assignment of a PUSCH (uplink radio resource) for the "Persistent scheduling" from the radio base station eNB.

In step S103, the mobile station UE determines whether or not the information on the uplink radio resource and the information notified by the persistent assignment signal, i.e., the PDCCH (uplink scheduling grant) giving an instruction of persistent assignment of a PUSCH (uplink radio resource) for the "Persistent scheduling" are inconsistent with each other.

Here, a detailed description of the aforementioned processing to determine whether or not an inconsistency exists is omitted herein because the description thereof is the same as that in the case of the mobile station UE.

In a case where the mobile station UE determines that the information on the uplink radio resource and the information notified by the persistent assignment signal, i.e., the PDCCH (uplink scheduling grant) giving an instruction of persistent assignment of a PUSCH (uplink radio resource) for the "Persistent scheduling" are inconsistent with each other (step S103: YES), the operation proceeds to step S104.

In step S104, the mobile station UE discards the persistent assignment signal, i.e., the PDCCH (uplink scheduling grant) giving an instruction of persistent assignment of a PUSCH (uplink radio resource) for the "Persistent scheduling".

Specifically, the mobile station UE regards the information notified by the persistent assignment signal, i.e., the PDCCH (uplink scheduling grant) giving an instruction of persistent assignment of a PUSCH (uplink radio resource) for the "Persistent scheduling" as information that has not been transmitted to the mobile station UE itself.

In step S105, the mobile station UE determines an uplink transmission sub-frame as the aforementioned assignment starting time, the uplink transmission sub-frame specified by the aforementioned Persistent assignment signal, i.e., the PDCCH (uplink scheduling grant) giving an instruction of persistent assignment of a PUSCH (uplink radio resource) for the "Persistent scheduling". The mobile station UE then starts persistent uplink data transmission via the PUSCH (uplink radio resource) for the "Persistent scheduling" in the aforementioned predetermined cycle, the transmission starting at the assignment starting time in step S105.

Specifically, in this case, the mobile station UE performs the uplink data transmission via the PUSCH (uplink radio resource) for the "Persistent scheduling", until the aforementioned PUSCH (uplink radio resource) for the "Persistent scheduling" is released.

(Advantageous Effect of Mobile Communication System According to First Embodiment of the Present Invention)

As described above, the probability of the occurrence of the False Alarm for one PDCCH (uplink scheduling grant or downlink scheduling grant information) is $1/2^{16}$.

In general, the mobile station UE attempts to decode about 40 PDCCHs in a single sub-frame, the total probability of the occurrence of the False Alarm is calculated as $40 \times 1/2^{16} = 0.0006$.

Here, the False Alarm described above is a phenomenon in which the mobile station UE incidentally determines that a PDCCH is transmitted to the mobile station UE itself although the PDCCH is not transmitted to the mobile station UE itself. Thus, the decoded information in this case is highly likely to be nonsense information.

Accordingly, as described above, a limitation is provided in the range of information in a PDCCH, and when the mobile station UE receives a PDCCH having information outside the limited range, the mobile station UE performs processing to discard the PDCCH. Thus, the probability of the occurrence of the False Alarm can be significantly reduced.

For example, suppose that the number of bits in a PDCCH other than CRC is 24 bits, and a 12-bit range among the 24 bits in the PDCCH is limited. For the sake of simplicity of calculation, suppose that the bit pattern of 12 bits is limited to a single kind.

In this case, as described above, a limitation is provided in the range of information in the PDCCH, and when the mobile station UE receives a PDCCH having information outside the limited range, the mobile station UE performs processing to discard the PDCCH. Thus, the probability of the occurrence of the False Alarm is calculated as follows:

$$40 \times 1/2^{16} \times 1/2^{12}/2^{24} = 1.5 \times 10^{-7}.$$

Thus, the probability of the occurrence of False Alarm is made much smaller in this case.

Specifically, the mobile communication system according to the first embodiment of the present invention is capable of reducing the probability of the occurrence of the "False Alarm" of a PDCCH (uplink scheduling grant) indicating a resource assignment for the Persistent scheduling. As a result, the mobile communication system according to the first embodiment of the present invention is capable of providing a stable and efficient mobile communication method, a mobile station, and a radio base station.

(Modification)

Note that operation of the above described mobile station UE and the radio base station eNB may be implemented by means of hardware, a software module executed by a processor, or a combination of both.

The software module maybe provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station transmits uplink data to a radio base station by using an uplink radio resource assigned to the mobile station by predetermined scheduling information, in a predetermined cycle, the method comprising the steps of:
   (A) notifying, to the mobile station, the predetermined cycle;
   (B) notifying, to the mobile station, the predetermined scheduling information; and
   (C) transmitting uplink data in the predetermined cycle by using a semi-persistent uplink radio resource assigned by the predetermined scheduling information, wherein the start of the transmission is determined by the mobile station on the basis of the received predetermined scheduling information, wherein
   the step (C) is performed when information included in the predetermined scheduling information is in compliance with a pre-specified range for the predetermined scheduling information, and wherein
   the pre-specified range is received at the mobile station from the base station by Radio Resource Control (RRC) message.

2. The mobile communication method according to claim 1, wherein
   the predetermined scheduling information includes at least one of resource block assignment information, a modulation scheme, a data size, MCS information, transmission format information, transmission power control information, information on Cyclic Shift of Demodulation RS, and a CQI request.

3. A mobile station configured to transmit uplink data to a radio base station by using an uplink radio resource assigned to the mobile station by predetermined scheduling information, in a predetermined cycle, the mobile station comprising:
- a receiver unit configured to receive the predetermined cycle from the radio base station; and
- a communication unit configured to transmit uplink data in the predetermined cycle by using a semi-persistent uplink radio resource assigned by the predetermined scheduling information, wherein the start of the transmission is determined by the mobile station on the basis of the received predetermined scheduling information, wherein the communication unit is configured to transmit the uplink data, when information notified by the predetermined scheduling information is in compliance with a pre-specified range for the predetermined scheduling information, and wherein the pre-specified range is received at the mobile station from the base station by Radio Resource Control(RRC) message.

4. The mobile station according to claim 3, wherein
the predetermined scheduling information includes at least one of resource block assignment information, a modulation scheme, a data size, MCS information, transmission format information, transmission power control information, information on Cyclic Shift of Demodulation RS, and a CQI request.

* * * * *